(12) United States Patent
Schmid et al.

(10) Patent No.: US 12,061,285 B2
(45) Date of Patent: Aug. 13, 2024

(54) DETECTING A PARKING ROW WITH A VEHICLE RADAR SYSTEM

(71) Applicant: Arriver Software AB, Linköping (SE)

(72) Inventors: Andreas Schmid, Dachau (DE); Christopher Unverdorben, Munich (DE); Christian Pfaffenzeller, Olching (DE)

(73) Assignee: Arriver Software AB, Linköping (SE)

( * ) Notice: Subject to any disclaimer, the term of this patent is extended or adjusted under 35 U.S.C. 154(b) by 294 days.

(21) Appl. No.: 16/763,003

(22) PCT Filed: Oct. 24, 2018

(86) PCT No.: PCT/EP2018/079142
§ 371 (c)(1),
(2) Date: May 11, 2020

(87) PCT Pub. No.: WO2019/091783
PCT Pub. Date: May 16, 2019

(65) Prior Publication Data
US 2020/0309908 A1 Oct. 1, 2020

(30) Foreign Application Priority Data
Nov. 9, 2017 (EP) ..................... 17200728

(51) Int. Cl.
*G01S 7/41* (2006.01)
*G01S 13/931* (2020.01)

(52) U.S. Cl.
CPC ............ *G01S 7/414* (2013.01); *G01S 13/931* (2013.01); *G01S 2013/9314* (2013.01); *G01S 2013/93274* (2020.01)

(58) Field of Classification Search
CPC ............ G01S 2013/9314; G01S 7/414; G01S 2013/93274; G01S 13/931
See application file for complete search history.

(56) References Cited

U.S. PATENT DOCUMENTS 3,668,403 A * 6/1972 Meilander ............... G01S 13/46
342/36
3,754,249 A * 8/1973 Kearney ................. F41G 7/007
244/3.13

(Continued)

FOREIGN PATENT DOCUMENTS

DE 102013103569 A1 10/2013
EP 2557020 A2 2/2013

(Continued)

OTHER PUBLICATIONS

International Search Report of PCT/EP2018/079142 dated Jan. 3, 2019.

(Continued)

*Primary Examiner* — Peter M Bythrow
(74) *Attorney, Agent, or Firm* — Arriver Software AB (57) ABSTRACT

A vehicle radar detection system arranged to be mounted in an ego vehicle and including at least one detector arrangement and at least one control unit arrangement. The detector arrangement is adapted to obtain a dataset initially including a number K of radar detections. The control unit arrangement is adapted to repeatedly determine a dominating line from the dataset of radar detections, remove radar detections associated with the dominating line from the dataset of radar detections until a first stopping criterion is fulfilled, thereby determining a plurality of lines from the number K of radar detections.

20 Claims, 7 Drawing Sheets

(56) References Cited

U.S. PATENT DOCUMENTS

| | | | | |
|---|---|---|---|---|
| 3,981,010 A * | 9/1976 | Michelsen | G01S 13/84 | 342/55 |
| 4,652,885 A * | 3/1987 | Saffold | H01Q 5/45 | 343/781 CA |
| 4,698,638 A * | 10/1987 | Branigan | F41G 7/008 | 342/53 |
| 4,780,719 A * | 10/1988 | Frei | G01S 13/86 | 342/67 |
| 5,005,147 A * | 4/1991 | Krishen | G06F 18/256 | 703/13 |
| 5,268,680 A * | 12/1993 | Zantos | F41G 7/226 | 343/781 CA |
| 5,307,077 A * | 4/1994 | Branigan | G01S 13/66 | 343/781 CA |
| 5,327,149 A * | 7/1994 | Kuffer | H01Q 21/28 | 343/781 CA |
| 5,341,142 A * | 8/1994 | Reis | F41G 7/2293 | 342/63 |
| 5,381,150 A * | 1/1995 | Hawkins | G01R 23/165 | 342/13 |
| 5,402,129 A * | 3/1995 | Gellner | G01S 13/44 | 342/70 |
| 5,554,990 A * | 9/1996 | McKinney | G01S 7/22 | 342/36 |
| 5,557,278 A * | 9/1996 | Piccirillo | G01S 13/91 | 342/36 |
| 5,728,965 A * | 3/1998 | Fesland | F41H 11/02 | 244/190 |
| 6,081,764 A * | 6/2000 | Varon | G08G 5/045 | 342/36 |
| 6,087,974 A * | 7/2000 | Yu | F41G 7/2246 | 342/149 |
| 6,262,679 B1 * | 7/2001 | Tran | G08G 5/0078 | 342/36 |
| 6,529,820 B2 * | 3/2003 | Tomescu | G08G 5/0082 | 342/36 |
| 6,563,453 B1 * | 5/2003 | Wilson | G01S 13/782 | 342/29 |
| 6,564,149 B2 * | 5/2003 | Lai | G01S 13/933 | 340/963 |
| 6,690,296 B2 * | 2/2004 | Corwin | G01S 13/782 | 340/963 |
| 6,707,052 B1 * | 3/2004 | Wild | F41H 11/02 | 342/14 |
| 6,877,691 B2 * | 4/2005 | DeFlumere | G01S 7/4802 | 342/52 |
| 6,903,676 B1 * | 6/2005 | Frady | G01S 13/723 | 342/52 |
| 7,202,809 B1 * | 4/2007 | Schade | F41H 11/02 | 89/1.816 |
| 7,205,932 B2 * | 4/2007 | Fiore | G01S 13/449 | 342/149 |
| 7,437,225 B1 * | 10/2008 | Rathinam | G05D 1/0027 | 342/36 |
| 7,492,308 B2 * | 2/2009 | Benayahu | F41H 7/00 | 342/55 |
| 7,504,982 B2 * | 3/2009 | Berg | F41G 7/224 | 342/13 |
| 7,548,184 B2 * | 6/2009 | Lo | G01S 13/865 | 342/52 |
| 7,551,121 B1 * | 6/2009 | O'Connell | F41G 5/08 | 342/60 |
| 7,619,555 B2 * | 11/2009 | Rolfe | H04B 7/18506 | 342/36 |
| 7,782,256 B2 * | 8/2010 | Smith | G01S 13/726 | 342/453 |
| 7,898,454 B1 * | 3/2011 | Starkey | G01S 7/38 | 342/14 |
| 7,961,133 B2 * | 6/2011 | Vollin | F41G 7/224 | 342/67 |
| 8,212,709 B2 * | 7/2012 | Bradley | F41G 7/224 | 342/13 |
| 8,258,994 B2 * | 9/2012 | Hamilton | F41G 7/224 | 250/493.1 |
| 8,258,998 B2 * | 9/2012 | Factor | G01S 13/867 | 342/13 |
| 8,330,641 B2 * | 12/2012 | Ryden | H04K 3/42 | 342/14 |
| 8,378,880 B1 * | 2/2013 | Boka | F41G 7/2206 | 342/52 |
| 8,378,881 B2 * | 2/2013 | LeMire | G01S 13/87 | 342/63 |
| 8,464,949 B2 * | 6/2013 | Namey | F41G 3/14 | 235/404 |
| 8,543,265 B2 * | 9/2013 | Ekhaguere | G08G 5/0021 | 701/423 |
| 9,041,798 B1 * | 5/2015 | Yerkes | H04N 7/188 | 348/148 |
| 9,170,069 B1 * | 10/2015 | Smith | F41G 7/224 | |
| 9,175,934 B1 * | 11/2015 | Kilian | F41H 11/02 | |
| 9,212,869 B1 * | 12/2015 | Boardman | G01S 13/726 | |
| 9,389,313 B2 | 7/2016 | Hiramaki et al. | | |
| 9,405,005 B1 * | 8/2016 | Arteaga | G08G 5/0021 | |
| 9,412,040 B2 | 8/2016 | Feng et al. | | |
| 9,495,877 B2 * | 11/2016 | Duffy | G08G 5/0013 | |
| 9,508,264 B2 * | 11/2016 | Chan | G08G 5/0039 | |
| 9,721,471 B2 | 8/2017 | Chen et al. | | |
| 9,889,798 B1 * | 2/2018 | Cong | G01S 13/66 | |
| 10,002,537 B2 | 6/2018 | Chen et al. | | |
| 2004/0021852 A1 * | 2/2004 | DeFlumere | F41G 7/2246 | 356/141.1 |
| 2004/0249519 A1 * | 12/2004 | Frink | B64D 45/0059 | 701/9 |
| 2006/0028373 A1 * | 2/2006 | Fullerton | F41H 11/00 | 342/67 |
| 2006/0028374 A1 * | 2/2006 | Fullerton | F41G 5/08 | 342/67 |
| 2006/0092075 A1 * | 5/2006 | Bruce | G01S 7/02 | 342/149 |
| 2006/0106506 A1 * | 5/2006 | Nichols | G01C 21/20 | 701/3 |
| 2006/0175464 A1 * | 8/2006 | Chang | F42B 12/32 | 244/3.15 |
| 2007/0052580 A1 * | 3/2007 | Fiore | G01S 13/32 | 342/146 |
| 2008/0018519 A1 * | 1/2008 | Berg | F41H 13/0068 | 342/67 |
| 2008/0088508 A1 * | 4/2008 | Smith | G01S 13/878 | 342/453 |
| 2009/0292468 A1 * | 11/2009 | Wu | G08G 1/165 | 342/146 |
| 2010/0042269 A1 * | 2/2010 | Kokkeby | G05D 1/0094 | 701/3 |
| 2010/0315281 A1 * | 12/2010 | Askelson | G08G 5/0013 | 703/2 |
| 2012/0143482 A1 * | 6/2012 | Goossen | G08G 5/0034 | 701/120 |
| 2012/0192707 A1 * | 8/2012 | Rogers | F41H 13/0006 | 89/930 |
| 2012/0211562 A1 * | 8/2012 | Cook | F41F 3/055 | 235/400 |
| 2012/0217301 A1 * | 8/2012 | Namey | F41G 3/04 | 235/411 |
| 2013/0321199 A1 * | 12/2013 | Suwa | G01S 13/5246 | 342/195 |
| 2014/0102288 A1 * | 4/2014 | Yeshurun | F41H 11/00 | 89/36.17 |
| 2014/0138474 A1 * | 5/2014 | Sharpin | F42B 15/01 | 244/3.22 |
| 2014/0200875 A1 * | 7/2014 | Yuksel Ergun | F41G 3/32 | 703/21 |
| 2014/0251123 A1 * | 9/2014 | Venema | F41G 3/06 | 89/41.22 |
| 2014/0266851 A1 * | 9/2014 | Fink | G01S 19/215 | 342/14 |
| 2015/0154467 A1 * | 6/2015 | Feng | G06V 20/10 | 382/203 |

(56) References Cited

U.S. PATENT DOCUMENTS

| | | | | |
|---|---|---|---|---|
| 2015/0183431 | A1* | 7/2015 | Nanami | B60W 30/095 |
| | | | | 701/301 |
| 2015/0219760 | A1* | 8/2015 | Hiramaki | G01S 15/08 |
| | | | | 367/99 |
| 2015/0254988 | A1* | 9/2015 | Wang | G08G 5/0021 |
| | | | | 701/3 |
| 2015/0344031 | A1* | 12/2015 | Weisswange | B60W 30/14 |
| | | | | 701/1 |
| 2016/0025850 | A1* | 1/2016 | Rigsby | G01S 13/72 |
| | | | | 342/61 |
| 2016/0117931 | A1* | 4/2016 | Chan | G08G 5/0043 |
| | | | | 701/120 |
| 2016/0171893 | A1* | 6/2016 | Chen | G01S 17/931 |
| | | | | 701/300 |
| 2016/0358483 | A1* | 12/2016 | Park | G01S 13/91 |
| 2017/0287337 | A1 | 10/2017 | Chen et al. | |
| 2017/0352163 | A1* | 12/2017 | Mottin | G05D 1/00 |
| 2018/0075320 | A1* | 3/2018 | Zermas | G06V 20/58 |
| 2018/0121750 | A1* | 5/2018 | Borkowski | G06V 10/42 |

FOREIGN PATENT DOCUMENTS

| | | |
|---|---|---|
| EP | 2899076 A1 | 7/2015 |
| JP | 2002243857 A | 8/2002 |
| JP | 2015108621 A | 6/2015 |

OTHER PUBLICATIONS

Teeravech, K., et al., "Discovering repetitive patterns in facade images using a RANSAC-style algorithm", ISPRS Journal of Photogrammetry and Remote Sensing, vol. 92, Mar. 31, 2014 (Mar. 31, 2014), pp. 38-53, XP002781155, ISSN: 0924-2716, DOI: 10.1016/j.isprsjprs.2014.02.018.

European Search Report—EP17200728—Search Authority—Munich—Jun. 5, 2018.

Friedman S., et al., "Online Facade Reconstruction from Dominant Frequencies in Structured Point Clouds", Computer Society Conference on Computer Vision and Pattern Recognition Workshops (CVPRW), 2012 IEEE, IEEE, Jun. 16, 2012 (Jun. 16, 2012), pp. 1-8, XP032206771, DOI: 10.11 09/CVPRW.2012.6238908, ISBN: 978-1-4673-1611-8.

Written Opinion—PCT/EP2018/079142—ISA/EPO—Jan. 3, 2019.

* cited by examiner

FIG. 4A first repetition
FIG. 4B second repetition
FIG. 4C third repetition
FIG. 4D fourth repetition
FIG. 4E fifth repetition
FIG. 4F sixth repetition

DETECTING A PARKING ROW WITH A VEHICLE RADAR SYSTEM

CROSS-REFERENCE TO RELATED APPLICATIONS

This application is a 35 U.S.C. § 371 national phase of PCT International Application No. PCT/EP2018/079142, filed Oct. 24, 2018, which claims the benefit of priority under 35 U.S.C. § 119 to European Patent Application No. 17200728.8, filed Nov. 9, 2017, the contents of which are incorporated herein by reference in their entirety.

FIELD OF THE INVENTION

The present disclosure relates to a vehicle radar system arranged to be mounted in an ego vehicle and including at least one detector arrangement and at least one control unit arrangement.

BACKGROUND

Today, one or more radar systems as well as other vehicle environmental detection systems such as for example Lidar (Light radar detection and ranging) and camera images, are often used in vehicles in order to detect obstacles in the surroundings. A vehicle radar system is usually arranged to distinguish or resolve single targets from the surroundings by using a Doppler effect in a previously well-known manner.

Apart from use for collision detector arrangements, radars as well as other vehicle environmental detection systems may for example be used for detecting available parking spots and for assisting when parking a vehicle. When detecting available space for parking, a row of parked cars has to be automatically identified.

A method for assisting a driver of a vehicle during a parking operation is described in EP 2557020. Environmental data characterizing the environment of the vehicle is provided and evaluated with respect to at least one first object in a lateral environment and at least one second object outside the lateral environment.

However, a more efficient and uncomplicated method and device for detecting available space for parking spots in a row of parked vehicles is desired, and in particular to be able to define lines that define an extension of such a row of parked vehicles.

The object of the present disclosure is thus to provide a vehicle radar system arranged for detecting available parking slots in a row of parked vehicles is desired, and in particular to be able to determine boundaries of a row of parked vehicles.

SUMMARY INTRODUCTORY DESCRIPTION OF EMBODIMENTS OF THE INVENTION

The previously described object is achieved by a vehicle radar detection system arranged to be mounted in an ego vehicle and including at least one detector arrangement and at least one control unit arrangement. The detector arrangement is adapted to obtain a dataset initially including a number K of radar detections. The control unit arrangement is adapted to, repeatedly determine a dominating line from the dataset of radar detections, and to remove radar detections associated with the dominating line from the dataset of radar detections, until a first stopping criterion is fulfilled, thereby determining a plurality of lines from the number K of radar detections.

The object is also achieved by using a method for a vehicle radar detection system arranged to be mounted in an ego vehicle. The method includes obtaining a dataset initially including a number K of radar detections, and, repeatedly until a first stopping criterion is fulfilled, determining a dominating line from the dataset of radar detections, and removing radar detections associated with the dominating line from the dataset of radar detections, thereby determining a plurality of lines from the number K of radar detections.

According to some aspects, the control unit arrangement is adapted to determine a dominating line from the dataset of radar detections by repeatedly select at least two radar detections, determine a temporary line based on the selected radar detections, and determine a set of inliers from the radar detections associated with the temporary line until a second stopping criterion is fulfilled. An inlier is a radar detection that lies within a certain predetermined distance from the determined temporary line. When the second stopping criterion is fulfilled, the control unit arrangement is adapted to determine the dominating line as the temporary line associated with the set of inliers having largest cardinality.

According to some aspects, for at least a number of the plurality of lines, the control unit arrangement is adapted to determine the number of radar detections within each one of a plurality of spatial slots that run parallel to the line in question. The plurality of spatial slots extend orthogonal to the line in question, such that a radar detection density distribution is obtained along an axis that runs orthogonal to the line in question.

According to some aspects, the control unit arrangement is adapted to analyze magnitudes of peaks of the radar detection density distribution, where peaks that lie within certain thresholds are determined to indicate parallel lines.

Other aspects of the present disclosure are disclosed in this description.

A number of advantages are obtained by the present disclosure. For example:

Enables a fast, uncomplicated and robust procedure for identifying radar detections that define a parking row.

Parking rows are easily detected even though partly covered or merged with road borders like close buildings.

No reference is needed, i.e. parking rows can be detected on free fields or in free space.

BRIEF DESCRIPTION OF THE DRAWINGS

The present disclosure will now be described more in detail with reference to the appended drawings, where.

DETAILED DESCRIPTION

Figure 1:
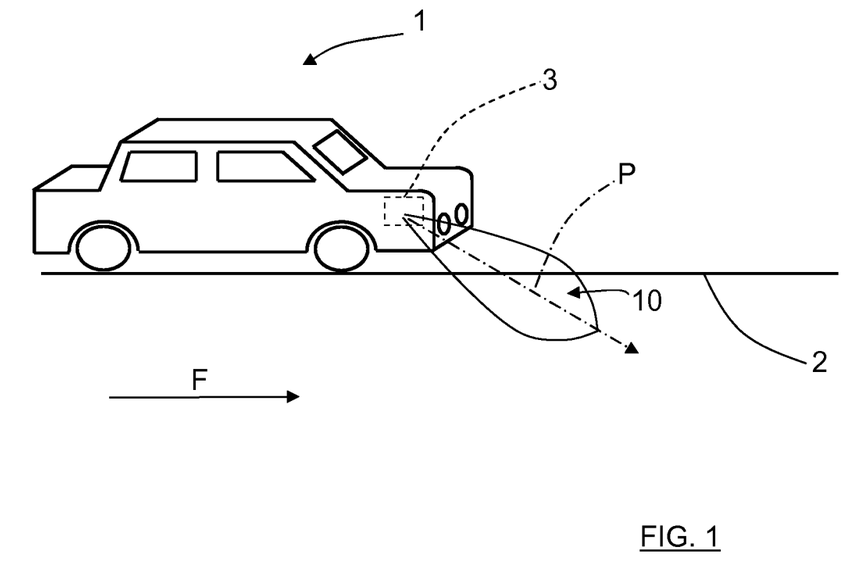
FIG. 1 shows a schematic side view of a vehicle.

FIG. 1 schematically shows a side view an ego vehicle 1 that travels on a road 2 in a movement direction F, where the vehicle 1 includes a vehicle radar system 3 which is arranged to distinguish and/or resolve single targets from the surroundings by using a Doppler effect together with analysis of received reflected signals in a previously well-known manner, i.e. successive echoes from the same point are superimposed and identified by use of Doppler effect. The radar system has a main field of view 10 that is aimed in a pointing direction P that extends more or less perpendicular to the movement direction F.

It is appreciated that the vehicle radar detections systems discussed herein are also applicable to stationary vehicles, such as parked vehicles that do not travel on a road.

Figure 2:
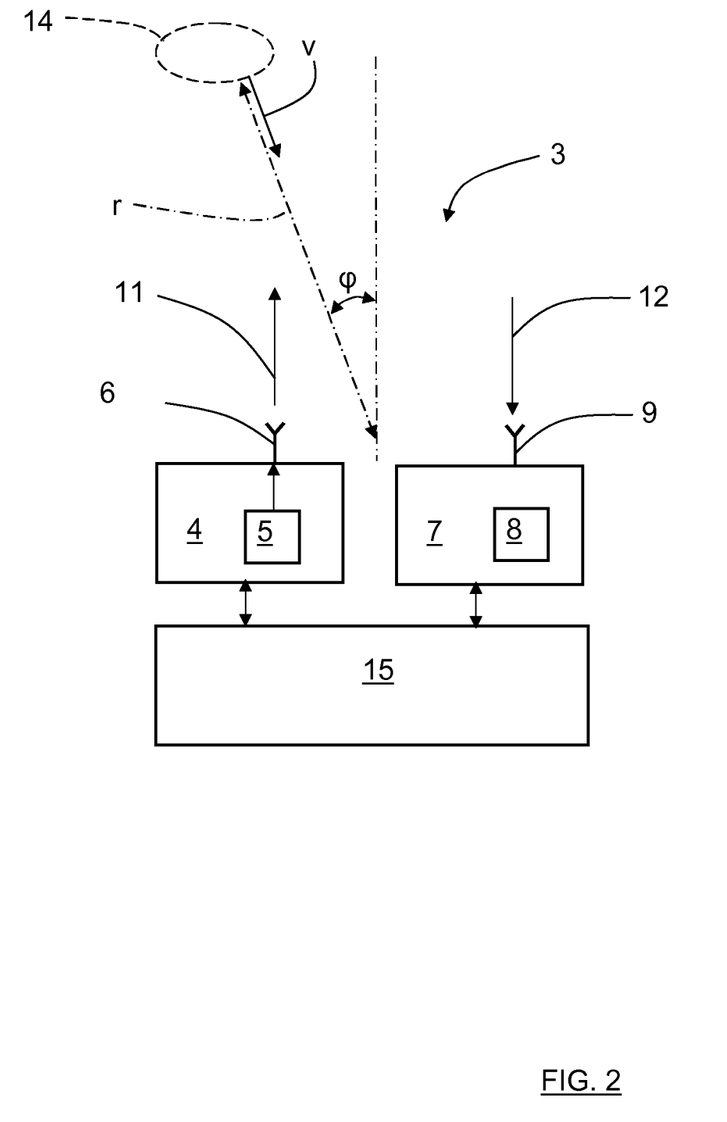
FIG. 2 shows a simplified schematic of a radar system according to the present disclosure.

With reference also to FIG. 2, the radar system 3 includes a transmitter arrangement 4 which in turn includes a signal generator 5 and a transmitter antenna arrangement 6. The vehicle radar system 3 further includes a receiver arrangement 7, which in turn includes a receiver 8 and a receiver antenna arrangement 9.

Transmitted signals 11 are reflected, and the reflected signals 12 are received by the receiver 8 via the receiver antenna arrangement 9. When in use, with reference also to FIG. 3, the transmitter antenna arrangement 6 sends a signal in the pointing direction P when the ego vehicle 1 runs past a parking row 13. The radar system 3 then receives the reflected signals 12 by using the receiver antenna arrangement 9. The field of view 10 corresponds to the beamwidth of the antenna arrangements 6, 9 in a previously known manner.

Figure 3:
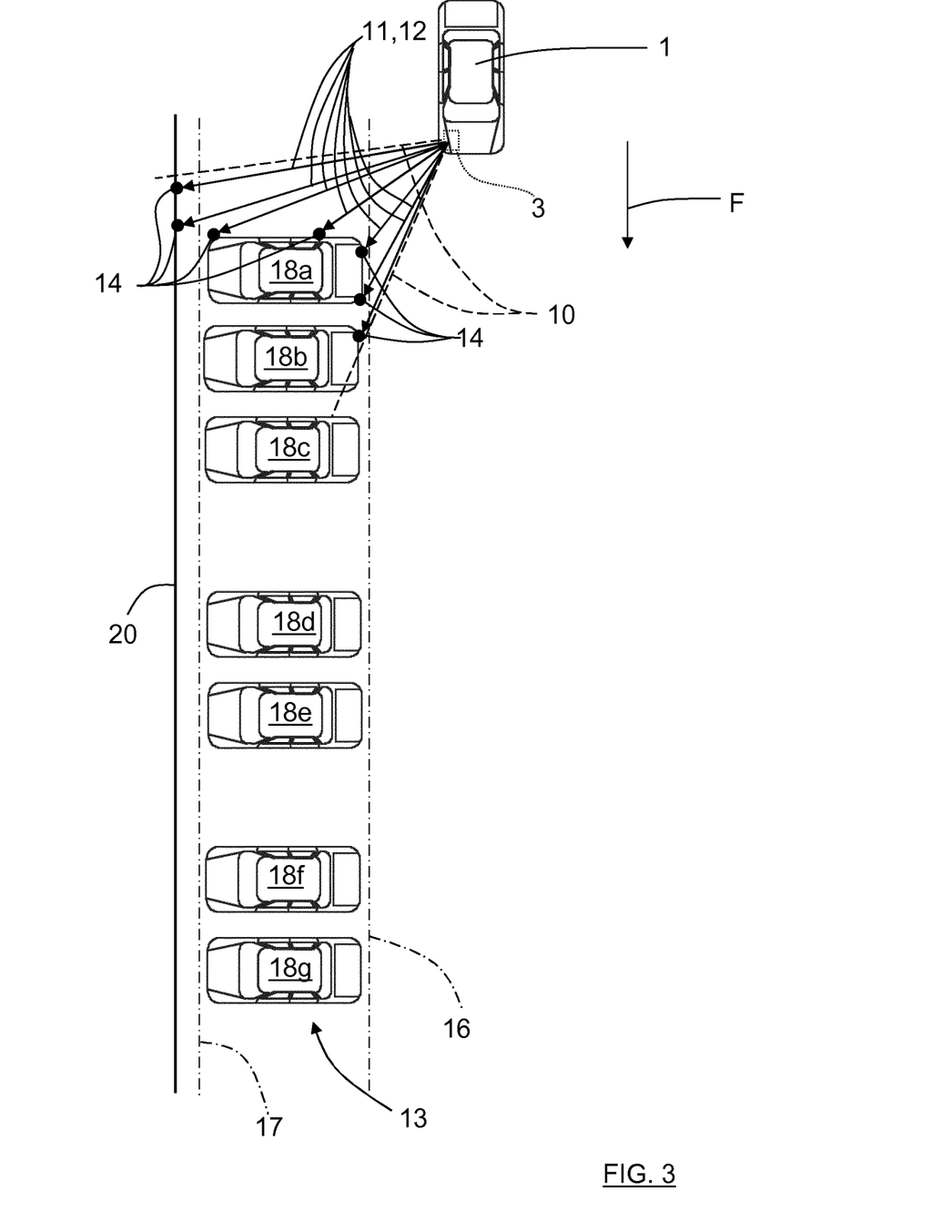
FIG. 3 shows a schematic top view of a vehicle passing a parking row according to a first example.
Figure 4A:
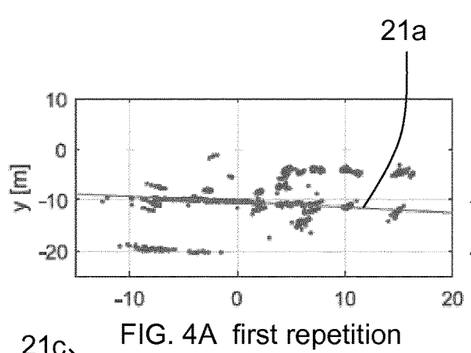
FIG. 4A-4F show a schematic top view of lines being determined from a dataset of radar detections.
Figure 4B:
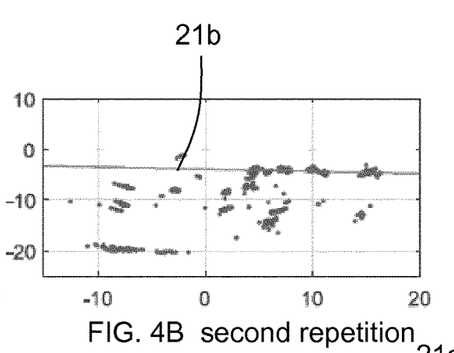
Figure 4C:
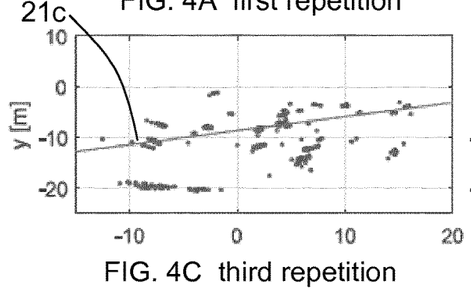
Figure 4D:
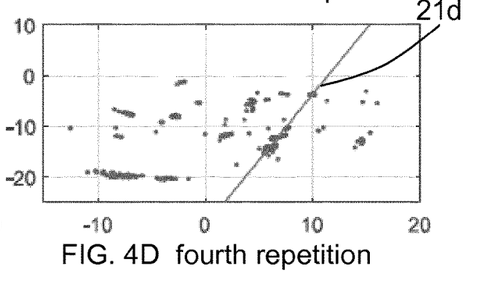
Figure 4E:
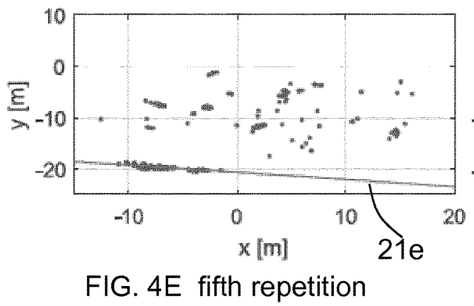
Figure 4F:
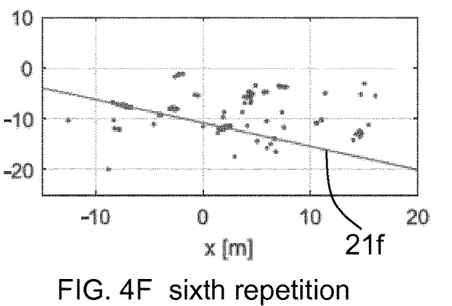

The above activity is repeated as many times as necessary at a predetermined frequency band, while the ego vehicle 1 moves in the movement direction F. At least one dataset including a number K of radar detections 14 is acquired during one or more radar cycles, where the number K can vary between different datasets if more than one dataset of radar detections is determined.

The receiver arrangement 7 provides filtered IF (Intermediate Frequency) signals converted to digital signals to a control unit arrangement 15 including a DSP (Digital Signal Processor) functionality that is adapted for radar signal processing, according to some aspects by using a first FFT (Fast Fourier Transform) to convert the digital signals to a range domain, and a second FFT to combine the results from successive radar cycles into the Doppler domain in a previously well-known manner.

The control unit arrangement 15 is thus arranged to provide at least azimuth angles of possible target objects by simultaneously sampling and analyzing phase and amplitude of the received signals 12. Each radar detection has a certain detected azimuth angle $\varphi$, distance r and radial velocity v as schematically indicated in FIG. 2.

With reference also to FIG. 3, the control unit arrangement 15 is adapted to determine a first border line 16 and a second border line 17, where these border lines 16, 17 are mutually parallel and define outer borders of the parking row 13.

A row of parked vehicles can initially be detected by the reflections of the side towards the ego car. In contrast to e.g. a wall, there are additional reflections of the other side of the parking row. These can be caused by a limitation 20 such as a curb, wall or hedge. But even if there is no limitation of the parking row 13 that is visible for the radar, there are reflections from the other side of the cars caused by their rim and bumper. It is desired to define the parking row by using the border lines 16, 17 independently of adverse influences.

In order to determine these border lines 16, 17, a RANSAC (Random sample consensus) algorithm can be used which fits a set of points to two parallel lines. The minimal dataset of radar detections needed to determine two parallel lines includes three points; with two points, a line can be defined, and with the third point, the distance to this line is defined. There are always three possibilities for combining three points to two lines. After calculating the parallel lines, the error for each radar detection and the inliers are calculated analogue to ordinary RANSAC.

For more complex environments, there are different problems. First, the shapes of calculated parallel lines 16, 17 are searched at the whole environment, where for example double reflections behind a wall 20 can seem to represent a parking row which isn't there. Furthermore, parallel lines which fits to most of the radar detections are chosen by RANSAC algorithm, such that a single line with many radar detections can be caused by a wall and a small tree, which could result in more inliers than a real parking row.

Radar detections caused by a parking row 13 do not always yield the strongest line in the field of view because of for example walls, fences or other strong reflective edges. In order to find a model in a row of radar detections with a high rate of outliers, which is the case in radar applications, the RANSAC algorithm is suitable, but the outcome of RANSAC algorithm is the strongest line, and all the other radar detections are outliers.

In the following, it will be described how this issue is overcome.

According to the present disclosure, a recursive RANSAC algorithm is run in a number of iteration steps for a certain dataset that initially includes a number K of radar detections 14. For each iteration step, the control unit arrangement 15 is arranged to:

determine a dominating line from the dataset of radar detections, and remove radar detections associated with the dominating line from the dataset of radar detections, until a first stopping criterion is fulfilled.

In this manner, for each iteration step, a line is acquired and the corresponding inliers are deleted from the dataset. The removed inliers are not used in the determining of the following lines, which is key to being able to find a plurality of lines from a single dataset of radar detections. A line is determined from the selected radar detections by fitting these detections to a line. Two radar detections can be used to define a line by use of an equation for a straight line that is well-known as $y=kx+m$ where k defines the lines slope and m defines its parallel displacement.

The first stopping criterion may be chosen according to application.

According to some non-limiting examples, the first stopping criterion may comprise;

iterating for a fixed pre-determined number of times, i.e., until a pre-determined number of lines has been obtained, iterating until a pre-determined number of radar detection remain in the dataset of radar detections, or iterating until a dominating line is associated with less than a pre-determined number of radar detections.

Within a number of strongest lines acquired, according to some aspects, the five or six strongest lines, the orientation of a parking row should be included, and these five or six orientations are used for further calculations. Thus, according to some aspects, the first stopping criterion includes iterating for a fixed pre-determined number of times equal to five times. According to some other aspects, the first stopping criterion includes iterating for a fixed pre-determined number of times equal to six times. The number of outliers, which influences the number of iteration steps, is high for the first step. With a reduced set of radar detections, the number of iterations can be reduced.

According to some aspects, the determining of a dominating line from the dataset of radar detections includes repeatedly:
  selecting at least two radar detections;
  determining a temporary line based on the selected radar detections; and
  determining a set of inliers from the radar detections associated with the temporary line, where an inlier is a radar detection that lies within a certain predetermined distance from the determined temporary line;
  until a second stopping criterion is fulfilled, and,
  when the second stopping criterion is fulfilled, determining the dominating line as the temporary line associated with the set of inliers having largest cardinality.

According to some aspects, the iteration steps are executed by using the control unit arrangement 15.

The second stopping criterion may also be chosen according to application. According to some non-limiting examples, the second stopping criterion may include;
  iterating until all combinations of two radar detections in the set of radar detections have been used to define temporary lines, i.e., exhaustive iteration, or
  iterating for a fixed and pre-determined number of times, i.e., until some pre-determined number radar detections have been used to define temporary lines, or
  selecting a pre-determined number of radar detections at random to define temporary lines, or
  iterating until a temporary line has been found that is associated with at least a pre-determined number of radar detection inliers, or
  iterating until a temporary line has been found that is associated with at least a number of radar detection inliers corresponding to a percentage of the previously determined dominating line.

In FIG. 4A-4F, an example of the first six iteration steps of a repetitive RANSAC algorithm are shown. The dataset of a plurality of radar detections is reduced by all inliers in each step. The first repetition shows the orientation of a wall in FIG. 4A, and the second outcome of repetitive RANSAC is the front edge of the parking row shown in FIG. 4B. After five iteration steps, there is just noise left.

The lines 21a, 21b, 21c, 21d, 21e, 21f determined by use of the above iteration steps can be further analyzed in many ways in order to find the correct parking lines that define a parking row 13. In the following, one example will be discussed.

Figure 5:
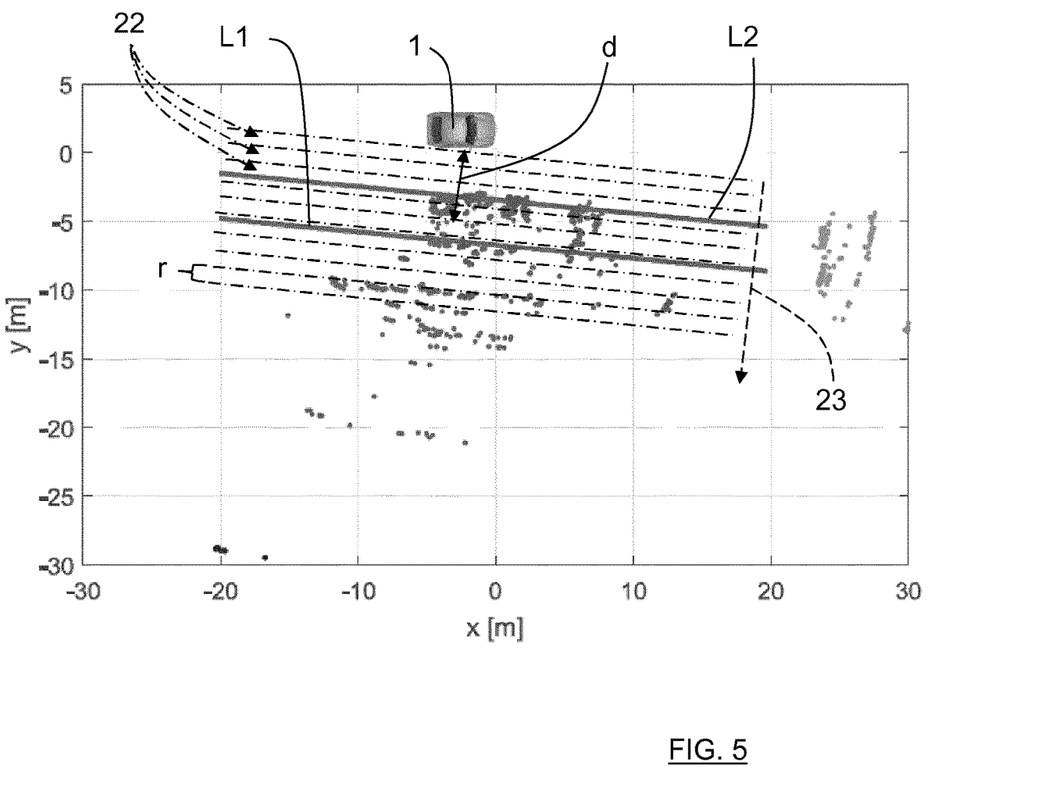
FIG. 5 shows a simplified schematic top view of a vehicle passing a dataset of radar detections.

With reference to FIG. 5, for each determined line, a radar detection density distribution P density is determined by the control unit arrangement 15. For that purpose, the control unit arrangement 15 is arranged to determine the number of radar detections within each one of a plurality of spatial slots 22 (only a few indicated in FIG. 5) that run parallel to the line in question L2. The plurality of spatial slots 22 extends orthogonal to the line in question, along an orthogonal axis 23, each slot 22 next to another, away from the ego vehicle 1, such that each slot 22 corresponds to a distance interval r from the ego vehicle 1. The extension of that distance interval r corresponds to a width that according to some aspects is the same for all slots.

According to some aspects the distance interval r is about 0.5 meters, and is chosen to receive one distinct peak even for slightly shifted parked vehicles in the parking row 13. Such a distance interval will result in a histogram representing the radar detection density distribution $P_{density}$.

Figure 6:
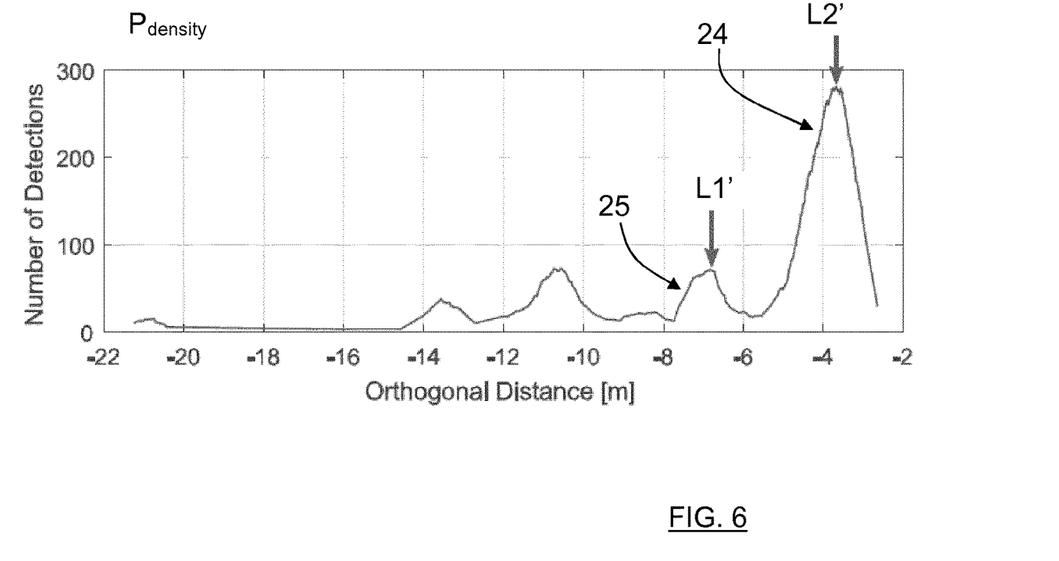
FIG. 6 shows a continuous histogram the for a radar detection density distribution.

In FIG. 6, a histogram of the radar detection density distribution P density is shown; here the distance interval r for each slot is very small such that each slot more or less is defined by a line. The acquired histogram is then evaluated for peaks. The line in question L2' has generated a first peak 24 at a little less than 4 meters from the ego vehicle 1, and a second peak 25, that here corresponds to another line L1' found in the above RANSAC iteration steps, is generated at about 7 meters from the ego vehicle 1.

The distance to the second peak 25 describes the distance to the reflections of the rear of a vehicle and has to be approximately at minimal 2 meters. The maximal distance is in this example set to 8 meters which is also depicted and excludes unwanted misinterpretations which are not related to a parking row 13. The height of the first peak 24 and consequently the accumulation of radar detections in front of a parking row is an indication that this is indeed a parking row with the correct orientation. A high radar detection density at one row with a repetition a few meters behind is a strong indication of a parking row 13. Even a slant wall behind the parking row does not influence the output.

The radar detection density distribution $P_{density}$ according to the above is determined in the form of a histogram for each determined line 21a, 21b, 21c, 21d, 21e, 21f acquired by using the repetitive RANSAC described above. All histograms are evaluated, and from the result, it can be determined which lines that correspond the actual border lines 16, 17 of the parking row 13.

Alternatively, according to some aspects, the control unit arrangement 15 is arranged to determine if any two of the determined lines 21a, 21b, 21c, 21d, 21e, 21f run mutually parallel. If there are two strong candidates, these are determined to correspond the actual border lines 16, 17 of the parking row 13.

By use of this approach, it can be determined if it is a row of parked vehicles that is detected, and if that is the case, the border lines 16, 17 of the parking row 13. Then, in further steps, it can be determined whether there are any available parking spots.

On the other hand, if there are no suitable peaks that can be matched to correspond to a parking row, the line in question probably belongs to another object or objects.

For reasons of clarity, only a few radar detections 14 are shown in FIG. 3. Of course, practically, there is a multitude of radar detections as depicted in FIGS. 4A-4F and FIG. 5. According to some aspects, the radar detections from a radar cycle are saved in a radar detection memory to the next radar cycle in order to provide a better representation of the environment. Radar detections from several such saved radar cycles can according to some aspects constitute a data set of radar detections according to the above.

Figure 7:
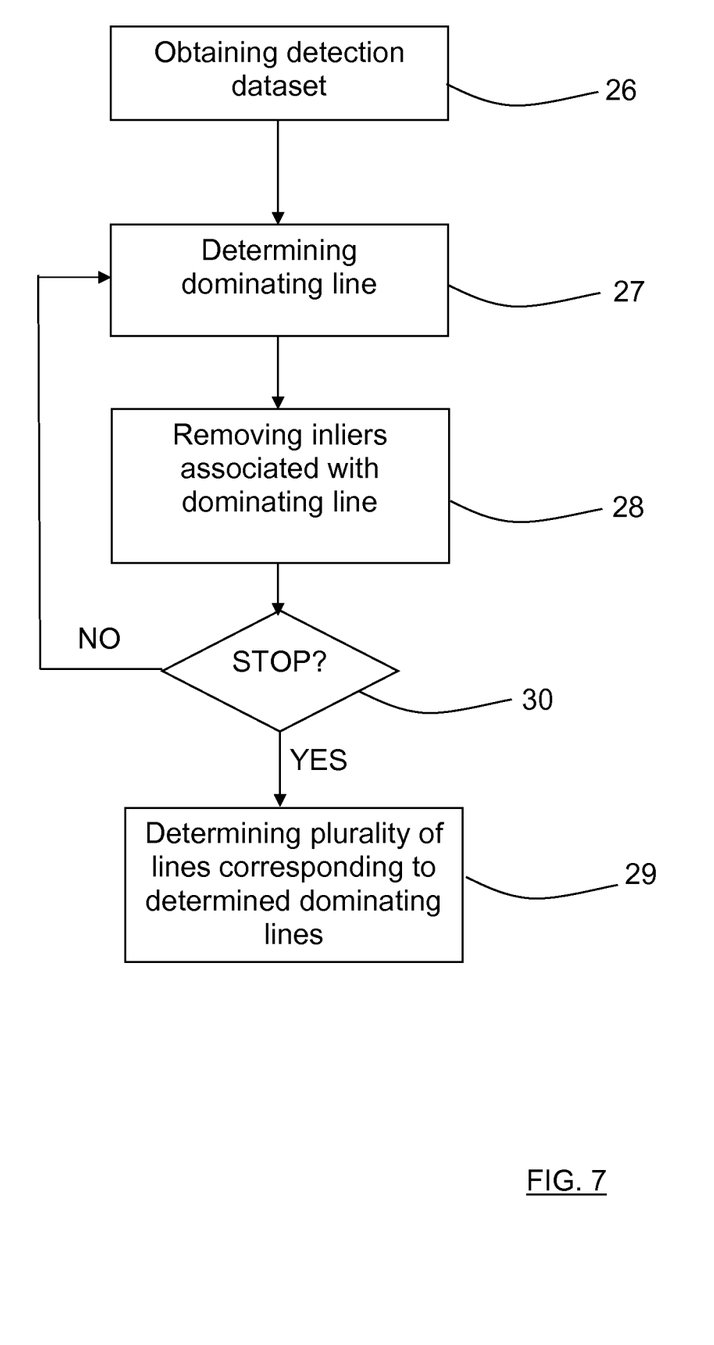
FIG. 7 shows a flowchart illustrating methods according to the present disclosure.

With reference to FIG. 7, the present disclosure also relates to a method for a vehicle radar detection system 3 arranged to be mounted in an ego vehicle 1. The method includes the steps of:

Step 26: obtaining a dataset initially including a number K of radar detections, and, repeatedly, Step 27: determining a dominating line from the dataset of radar detections, and Step 28: removing radar detections associated with the dominating line from the dataset of radar detections 28, until a first stopping criterion 30 is fulfilled, thereby Step 29: determining a plurality of lines 21a, 21b, 21c, 21d, 21e, 21f from the number K of radar detections 14.

Figure 8:
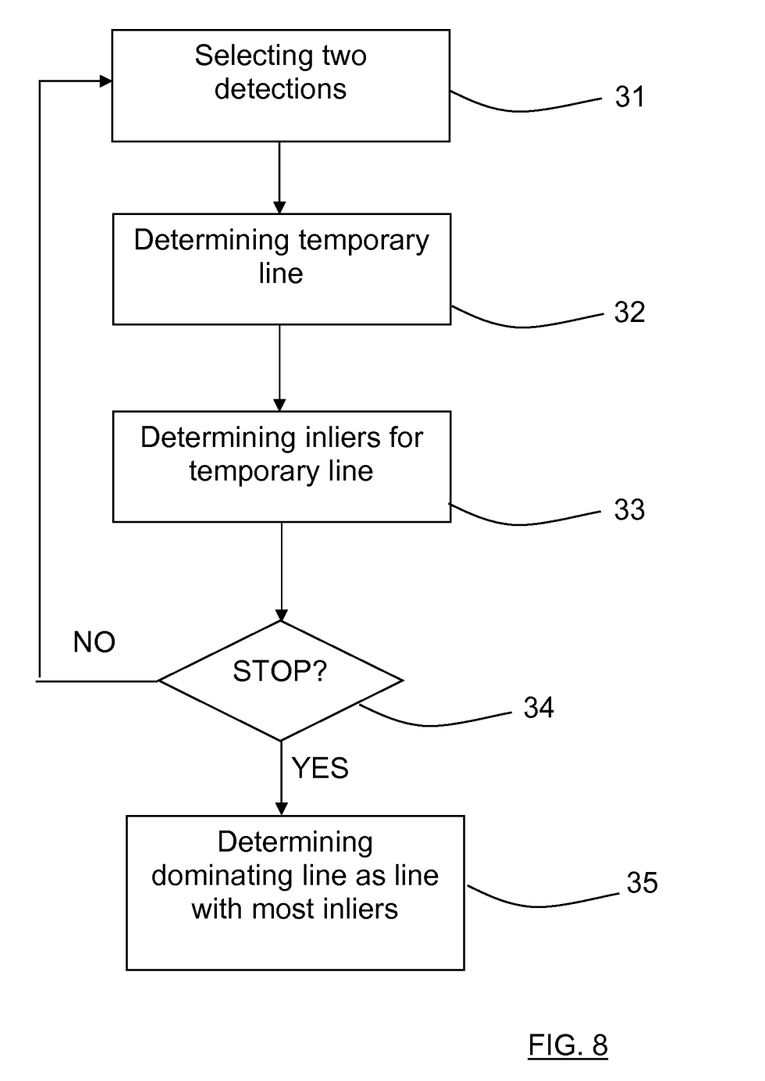
FIG. 8 shows a flowchart illustrating methods according to the present disclosure.

With reference to FIG. 8, according to aspects, the determining a dominating line from the dataset of radar detections includes repeatedly the steps of:

Step 31: selecting at least two radar detections;

Step 32: determining a temporary line based on the selected radar detections;

Step 33: determining a set of inliers from the radar detections associated with the temporary line, where an inlier is a radar detection that lies within a certain predetermined distance from the determined temporary line;

until a second stopping criterion 34 is fulfilled, and, when the second stopping criterion is fulfilled, the method includes:

Step 35: determining the dominating line as the temporary line associated with the set of inliers having largest cardinality.

The present disclosure is not limited to the examples above, but may vary freely within the scope of the appended claims. For example, the radar system may be implemented in any type of vehicle such as cars, trucks and buses as well as boats and aircraft.

All drawings are simplified, only showing parts that are considered relevant for an adequate description of the present disclosure. It is understood that the general design of radar systems of this kind is well-known in the art.

The constitution of the antennas included in the transmitter antenna arrangement 6 and receiver antenna arrangement 9 may be of any suitable design, such as slot antennas of patch antennas. The transmitter antenna arrangement 6 and receiver antenna arrangement 9 may be combined in one antenna arrangement that is arranged for both transmission and reception by using, for example, time division.

Terms such as perpendicular and parallel are not to be interpreted as mathematically exact, but within what is practical in the present context.

According to some aspects, the control unit arrangement 15, includes one or several separate control units that are arranged together or in a distributed manner.

According to some aspects, the ego vehicle 1 does not have to be moving, but can be motionless.

The movement direction F can be directed in a forward movement direction as well as in a rearward movement direction.

According to some aspects, the ego vehicle 1 can approach the parking row from any angle; each approaching angle is possible as long as the parking row is in the field of view of the radar system 3 or in a radar detection memory.

In the examples, the ego vehicle 1 is adapted to check for parking rows at only on side, but according to some aspects, the ego vehicle 1 is adapted to check for parking rows at both sides or in the front or the back of the ego vehicle 1.

In practical situations, the radar detections 14 can be distributed in three dimensions and not only in two dimensions as shown in the examples. The present disclosure is of course applicable irrespective of how the radar detections 14 are distributed.

Generally, there is disclosed herein a vehicle radar system 3 arranged to be mounted in an ego vehicle 1 and including at least one detector arrangement 4, 7, and at least one control unit arrangement 15, where the detector arrangement 4, 7 is adapted to obtain a dataset initially including a number K of radar detections 14. The control unit arrangement 15 is adapted to, repeatedly:

determine a dominating line from the dataset of radar detections, and to remove radar detections associated with the dominating line from the dataset of radar detections, until a first stopping criterion is fulfilled, thereby determining a plurality of lines 21a, 21b, 21c, 21d, 21e, 21f from the number K of radar detections 14.

According to some aspects, the control unit arrangement 15 is adapted to determine a dominating line from the dataset of radar detections by repeatedly:

select at least two radar detections 14;

determine a temporary line based on the selected radar detections 14; and determine a set of inliers from the radar detections associated with the temporary line, where an inlier is a radar detection that lies within a certain predetermined distance from the determined temporary line;

until a second stopping criterion is fulfilled, and when the second stopping criterion is fulfilled, the control unit arrangement 15 is adapted to determine the dominating line 21a, 21b, 21c, 21d, 21e, 21f as the temporary line associated with the set of inliers having largest cardinality.

According to some aspects, for at least a number of the plurality of lines 21a, 21b, 21c, 21d, 21e, 21f, the control unit arrangement 15 is adapted to determine the number of radar detections within each one of a plurality of spatial slots 22 that run parallel to the line in question 21b, where the plurality of spatial slots 22 extend orthogonal to the line in question 21b, such that a radar detection density distribution $P_{density}$ is obtained along an axis 23 that runs orthogonal to the line in question 21b.

According to some aspects, each slot 22 corresponds to a distance interval r.

According to some aspects, the control unit arrangement 15 is adapted to analyze magnitudes of peaks of the radar detection density distribution $P_{density}$, where peaks that lie within certain thresholds are determined to indicate parallel lines.

According to some aspects, for at least a number of the plurality of lines 21a, 21b, 21c, 21d, 21e, 21f, the control unit arrangement 15 is adapted to determine which lines that are mutually parallel by comparing the lines in question.

Generally, there is also disclosed herein a method for a vehicle radar system 3 arranged to be mounted in an ego vehicle 1, including the steps of:

Step 26: obtaining a dataset initially including a number K of radar detections 14, and, repeatedly, Step 27: determining a dominating line 21a, 21b, 21c, 21d, 21e, 21f from the dataset of radar detections, and Step 28: removing radar detections associated with the dominating line 21a, 21b, 21c, 21d, 21e, 21f from the dataset of radar detections; until a first stopping criterion 30 is fulfilled, thereby Step 29: determining a plurality of lines 21a, 21b, 21c, 21d, 21e, 21f from the number K of radar detections 14.

According to some aspects, the determining a dominating line 21a, 21b, 21c, 21d, 21e, 21f from the dataset of radar detections includes repeatedly the steps of:

Step 31: selecting at least two radar detections;

Step 32: determining a temporary line based on the selected radar detections;

Step 33: determining a set of inliers from the radar detections associated with the temporary line, where an inlier is a radar detection that lies within a certain predetermined distance from the determined temporary line;

until a second stopping criterion 34 is fulfilled, and, when the second stopping criterion is fulfilled, the method c includes:

Step 35: determining the dominating line as the temporary line associated with the set of inliers having largest cardinality.

According to some aspects, for at least a number of the plurality of lines 21a, 21b, 21c, 21d, 21e, 21f, the method includes determining the number of radar detections within each one of a plurality of spatial slots 22 that run parallel to the line in question 21b, where the plurality of spatial slots 22 extend orthogonal to the line in question 21b, such that a radar detection density distribution $P_{density}$ is obtained along an axis 23 that runs orthogonal to the line in question 21b.

According to some aspects, each slot 22 corresponds to a distance interval r.

According to some aspects, the method includes analyzing magnitudes of peaks of the radar detection density distribution $P_{density}$, where peaks that lie within certain thresholds are determined to indicate parallel lines.

According to some aspects, for at least a number of the plurality of lines 21a, 21b, 21c, 21d, 21e, 21f, the method includes determining which lines that are mutually parallel by comparing the lines in question.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system arranged to be mounted in an ego vehicle and including:
    at least one detector arrangement; and
    at least one control unit arrangement,
    wherein the detector arrangement is configured to obtain a dataset initially including a number K of radar detections, and
    wherein the control unit arrangement is configured to, for determination of a plurality of lines corresponding to dominating lines of respective iterations from the number K of radar detections, repeatedly until a first stopping criterion is fulfilled:
        determine a dominating line for a current iteration from the dataset of radar detections for the current iteration, and
        update the dataset of radar detections for a next iteration based on removal of radar detections associated with the dominating line for the current iteration from the dataset of radar detections for the current iteration.

2. The vehicle radar system according to claim 1, wherein the control unit arrangement is configured to, for determination of the dominating line for the current iteration:
    for determination of one or more temporary lines, repeatedly until a second stopping criterion is fulfilled:
        select at least two radar detections,
        determine one of the one or more temporary lines based on the at least two selected radar detections, and
        determine a set of inliers from the radar detections associated with the one of the one or more temporary lines, wherein an inlier is a radar detection that lies within a certain predetermined distance from the determined one of the one or more temporary lines; and
    based on the second stopping criterion being fulfilled, determine, from the one or more temporary lines, the dominating line as the temporary line associated with the set of inliers having largest cardinality.

3. The vehicle radar system according to claim 1, wherein the control unit arrangement is configured to determine, for a line in question from the plurality of lines, a number of radar detections within each one of a plurality of spatial slots that run parallel to the line in question, where the plurality of spatial slots extend orthogonal to the line in question, such that a radar detection density distribution ($P_{density}$) is obtained along an axis that runs orthogonal to the line in question.

4. The vehicle radar system according to claim 3, wherein each slot of the plurality of spatial slots corresponds to a distance interval r.

5. The vehicle radar system according to claim 4, wherein the control unit arrangement is configured to analyze magnitudes of peaks of the radar detection density distribution ($P_{density}$), wherein peaks that lie within certain thresholds are determined to indicate parallel lines.

6. The vehicle radar system according to claim 1, wherein the control unit arrangement is configured to determine which lines from the plurality of lines are mutually parallel by comparing the lines.

7. A method for a vehicle radar system arranged to be mounted in an ego vehicle, comprising:
    obtaining, by at least one detector of the vehicle radar system, a dataset initially including a number K of radar detections; and
    determining, by at least one controller of the vehicle radar system, a plurality of lines corresponding to dominating lines of respective iterations from the number K of radar detections by performing, repeatedly until a first stopping criterion is fulfilled:
        determining a dominating line for a current iteration from the dataset of radar detections for a current iteration, and
        updating the dataset of radar detections for a next iteration by removing radar detections associated with the dominating line for the current iteration from the dataset of radar detections for the current iteration.

8. The method according to claim 7, wherein the determining the dominating line for the current iteration from the dataset of radar detections for the current iteration includes:
    determining one or more temporary lines, including performing, repeatedly until a second stopping criterion is fulfilled:
        selecting at least two radar detections;
        determining one of the one or more temporary lines based on the at least two selected radar detections;
        determining a set of inliers from the radar detections associated with the one of the one or more temporary lines, where an inlier is a radar detection that lies within a certain predetermined distance from the determined one of the one or more temporary lines; and
    based on the second stopping criterion being fulfilled, determining, from the one or more temporary lines, the dominating line as the temporary line associated with the set of inliers having largest cardinality.

9. The method according to claim 7, further comprising, for a line in question from the plurality of lines, determining a number of radar detections within each one of a plurality of spatial slots that run parallel to the line in question, where the plurality of spatial slots extend orthogonal to the line in question, such that a radar detection density distribution ($P_{density}$) is obtained along an axis that runs orthogonal to the line in question.

10. The method according to claim 9, wherein each slot of the plurality of spatial slots corresponds to a distance interval r.

11. The method according to claim 10, further comprising analyzing magnitudes of peaks of the radar detection density distribution ($P_{density}$), wherein peaks that lie within certain thresholds are determined to indicate parallel lines.

12. The method according to claim 7, further comprising determining which lines from the plurality of lines are mutually parallel by comparing the lines.

13. The vehicle radar system according to claim 1, wherein the first stopping criterion is, after the current iteration:
a predetermined number of iterations has been performed,
a predetermined number of lines has been obtained,
a predetermined number of remaining radar detections in the dataset of radar detections for the next iteration has been reached, or
the radar detections associated with the dominating line for the current iteration is less than a predetermined threshold.

14. The method according to claim 7, wherein the first stopping criterion is, after the current iteration:
a predetermined number of iterations has been performed,
a predetermined number of lines has been obtained,
a predetermined number of remaining radar detections in the dataset of radar detections for the next iteration has been reached, or
the radar detections associated with the dominating line for the current iteration is less than a predetermined threshold.

15. A vehicle radar system arranged to be mounted in an ego vehicle and including:
at least one detector arrangement; and
at least one control unit arrangement,
wherein the detector arrangement is configured to obtain a dataset initially including a number K of radar detections,
wherein the control unit arrangement is configured to, for determination of a plurality of lines corresponding to dominating lines of respective iterations from the number K of radar detections, repeatedly until a first stopping criterion is fulfilled:
determine a dominating line for a current iteration from the dataset of radar detections for the current iteration, and
update the dataset of radar detections for a next iteration based on removal of radar detections associated with the dominating line for the current iteration from the dataset of radar detections for the current iteration, and wherein the control unit arrangement is further configured to, for determination of the dominating line for the current iteration:
for determination of one or more temporary lines, repeatedly until a second stopping criterion is fulfilled:
select at least two radar detections,
determine one of the one or more temporary lines based on the at least two selected radar detections, and
determine a set of inliers from the radar detections associated with the one of the one or more temporary lines, wherein an inlier is a radar detection that lies within a certain predetermined distance from the determined one of the one or more temporary lines; and
based on the second stopping criterion being fulfilled, determine, from the one or more temporary lines, the dominating line as the temporary line associated with the set of inliers having largest cardinality.

16. The vehicle radar system according to claim 15, wherein the control unit arrangement is configured to determine, for a line in question from the plurality of lines, a number of radar detections within each one of a plurality of spatial slots that run parallel to the line in question, where the plurality of spatial slots extend orthogonal to the line in question, such that a radar detection density distribution ($P_{density}$) is obtained along an axis that runs orthogonal to the line in question.

17. The vehicle radar system according to claim 16, wherein each slot of the plurality of spatial slots corresponds to a distance interval r.

18. The vehicle radar system according to claim 17, wherein the control unit arrangement is configured to analyze magnitudes of peaks of the radar detection density distribution ($P_{density}$), wherein peaks that lie within certain thresholds are determined to indicate parallel lines.

19. The vehicle radar system according to claim 15, wherein the control unit arrangement is configured to determine which lines from the plurality of lines are mutually parallel by comparing the lines.

20. The vehicle radar system according to claim 15, wherein the first stopping criterion is, after the current iteration:
a predetermined number of iterations has been performed,
a predetermined number of lines has been obtained,
a predetermined number of remaining radar detections in the dataset of radar detections for the next iteration has been reached, or
the radar detections associated with the dominating line for the current iteration is less than a predetermined threshold.

* * * * *